United States Patent [19]
Bergen

[11] 3,937,187
[45] Feb. 10, 1976

[54] TOROIDAL CYLINDER ORBITING PISTON ENGINE

[76] Inventor: Henry Bergen, P.O. Dowa, Dowa, Malawi

[22] Filed: Mar. 15, 1974

[21] Appl. No.: 451,577

[52] U.S. Cl. .................. 123/8.47; 418/36; 418/38
[51] Int. Cl.² .......................................... F02B 55/14
[58] Field of Search ..................... 418/36, 33–35, 418/37–38, 144; 123/8.47

[56] References Cited
UNITED STATES PATENTS

| | | | |
|---|---|---|---|
| 1,482,627 | 2/1924 | Bullington | 418/33 |
| 1,973,397 | 9/1934 | Stromberg | 123/8.47 |
| 2,362,550 | 11/1944 | Hansen | 123/8.47 |
| 3,034,486 | 5/1962 | Buxton | 123/8.47 |
| 3,302,625 | 2/1967 | Cunningham | 123/8.47 |
| 3,476,056 | 11/1969 | Bright | 418/36 |

FOREIGN PATENTS OR APPLICATIONS

| 533,758 | 2/1941 | United Kingdom | 123/8.47 |
|---|---|---|---|

Primary Examiner—Carlton R. Croyle
Assistant Examiner—O. T. Sessions
Attorney, Agent, or Firm—Ade, Kent and Associates

[57] ABSTRACT

A toroidal cylinder is provided with a slot formed around the inner wall. A central shaft carries a sun-wheel engaging a set of planet gears which in turn engage a fixed ring gear secured to the cylinder adjacent the slot. A pair of rings are provided carrying sets of pistons running within the cylinder, the edges of the rings sealably running within the slot. Pins on the planet gears engage slotted arms secured to the rings so that opposite pairs of pistons move toward and away from one another in sequence thus providing compression and expansion strokes in the cylinder together with intake and exhaust strokes. A fuel mixture ignited by spark plugs or the like may be used or, alternatively, fuel injection may be utilized and inlet and exhaust ports are formed within the walls of the toroidal cylinder.

4 Claims, 6 Drawing Figures 3,937,187

TOROIDAL CYLINDER ORBITING PISTON ENGINE

BACKGROUND OF THE INVENTION

Reciprocating piston type internal combustion engines whether two or four stroke, suffer from two principal disadvantages. In the two-stroke engine, the intake air/fuel mixture is mixed with the exhaust gases remaining in the cylinder or is partially blown out with them and in the four-stroke engine, energy is wasted in separate exhaust and intake strokes as well as in the valve operating system. Furthermore, in both types of engine, the pistons have to be accelerated to a maximum speed and then slowed down and stopped both at the upper and lower ends of the piston which causes considerable wear to the components making up the engine.

Rotary engines solve these problems in general, but suffer also from disadvantages, the principal one of which is balance and difficulty in sealing and lubrication.

SUMMARY OF THE INVENTION

The present invention overcomes these disadvantages by providing a toroidal cylinder divided into two intake/compression sections and two/expansion/exhaust sections and eliminating valves and crank shafts. Double-headed pistons are provided which carry out two functions in one section of the cylinder at the same time and the engine is readily adapted for use with gasoline or diesel fuel operation. Furthermore, by modifying the exhaust and intake ports, it is readily adaptable for use with steam.

The principal object and essence of the invention is therefore to provide a device of the character herewithin described which includes a toroidal cylinder having an annular slot formed on the inner wall within which a pair of rings are sealably engaged for rotation, sets of pistons being secured to the outer periphery of the rings and adapted to orbit within the toroidal cylinder.

Another object of the invention is to provide a device of the character herewithin described which is readily adapted for use with a standard carburetor or fuel injection or, alternatively, for use with diesel fuel or steam.

Still another object of the invention is to provide a device of the character herewithin described which is provided with a minimum of moving parts all of which rotate around a central axial shaft which acts as the drive shaft.

Still another object of the invention is to provide a device of the character herewithin described in which balance is provided by positioning the pistons equidistantly around the periphery of the rings.

Another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

In the drawings like characters of reference indicate corresponding parts in the different figures.

DETAILED DESCRIPTION

Proceeding therefore to describe the invention in detail, reference should be made to the accompanying drawings in which 10 illustrates in general, a toroidal cylinder.

In the present embodiment, this cylinder is made in two halves and outstanding flanges 11 are secured together as by nut and bolt assemblies 12.

However, it will be appreciated that the division may be equatorial which may assist in manufacturing, but of course makes the sealing of the two halves a little more difficult.

Figure 2:
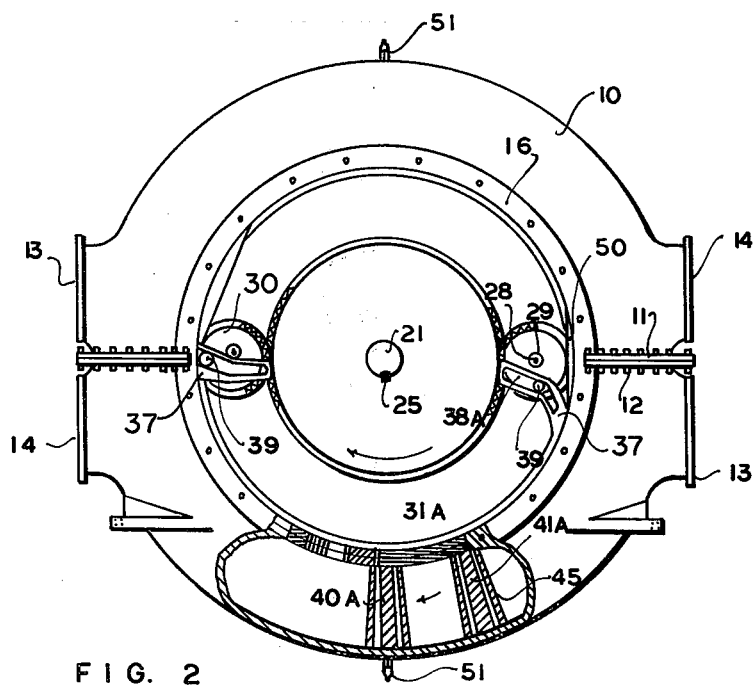
FIG. 2 is a view similar to FIG. 1, but with one end plate removed and the cylinder partially cut away to show the interior thereof.

Intake ports 13 and exhaust ports 14 are formed diametrically opposite one another within the outer wall of the toroidal cylinder as clearly illustrated in FIG. 2.

An annular slot 15 is formed around the inner wall or inner diameter of the toroidal cylinder and the edges of the slot are machined as is the internal surfaces of the toroidal cylinder.

Figure 3:
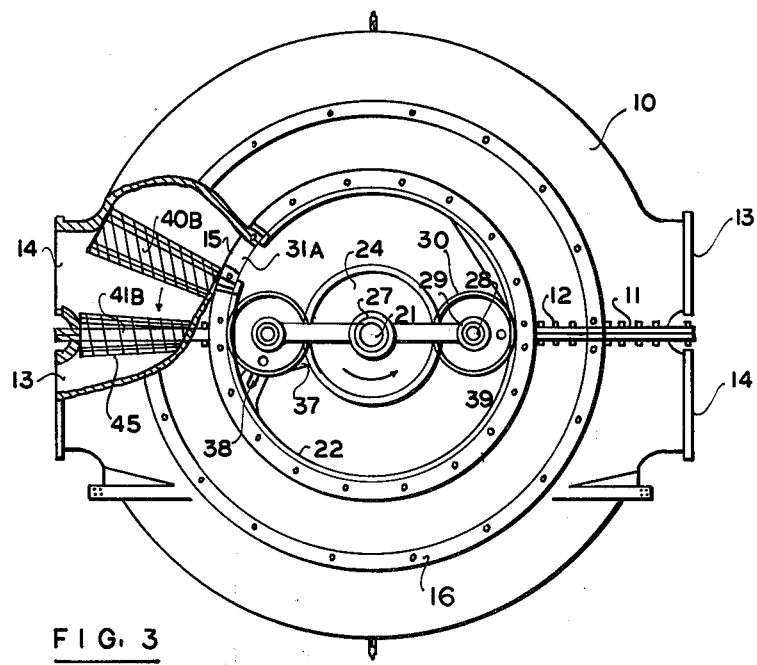
FIG. 3 is a view reversed from FIG. 2 with the end plate removed and the cylinder partially cut away to show the interior thereof.

Planar surfaces 16 are machined just above the slots 15 (FIG. 2) and near the centre of the back half of the toroidal cylinder (FIG. 3) and cover plates 17 and 18 are bolted to these planar surfaces by means of bolts 19 so that the plates 17 and 18 are in spaced and parallel relationship one with the other and span the central area within the toroidal cylinder.

These plates carry bearings 20 centrally thereof within which a main drive shaft 21 is supported for rotation axially in relation to the toroidal cylinder as clearly illustrated.

A ring gear 22 is secured around the inner wall of the toroidal cylinder within the area enclosed by plates 17 and 18 by means of bolts 23 (see FIG. 5) and a sun gear 24 is keyed to the drive shaft 21 by means of key 25 and this sun gear is in substantially the same plate as the ring gear 22.

A spider 26 is freely supported upon shaft 21 by means of ball race 27 or the like and pins 28 extend upwardly from the ends of the spider and are supported for rotation within ball races 29 provided in the ends of the spider.

Figure 6:
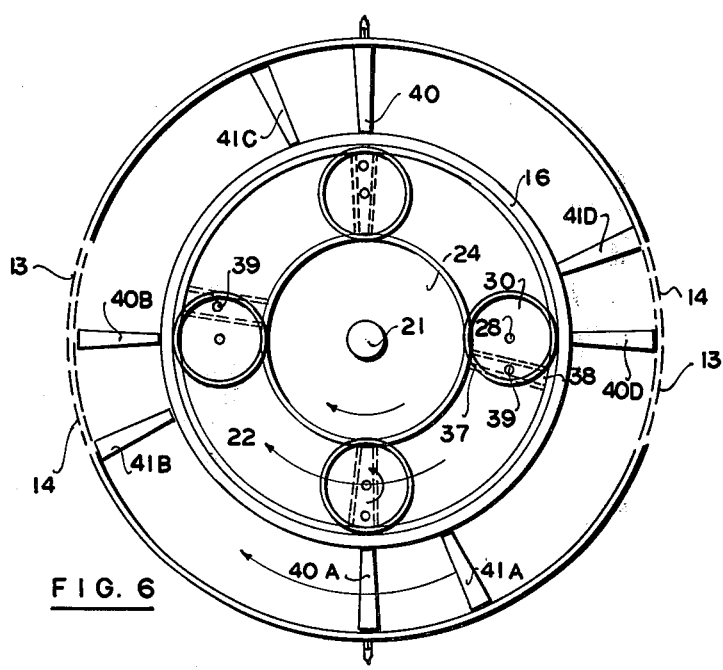
FIG. 6 is a schematic view showing the relative position of the pistons in one position.

Planetary gears 30 are secured to pins 28 and mesh with the sun gear 24 and with the ring gear 23 as clearly illustrated in the drawings and although two such planetary gears are shown in the majority of the views, it will be noted that four such gears are shown in FIG. 6.

A pair of rings 31 and 31A are provided and act as piston carrying components and these rings engage within the aforementioned slot 15 and rotate in the slot being in sealing relationship with one another and with the walls of the cylinder bounding or defining the slot.

Figure 5:
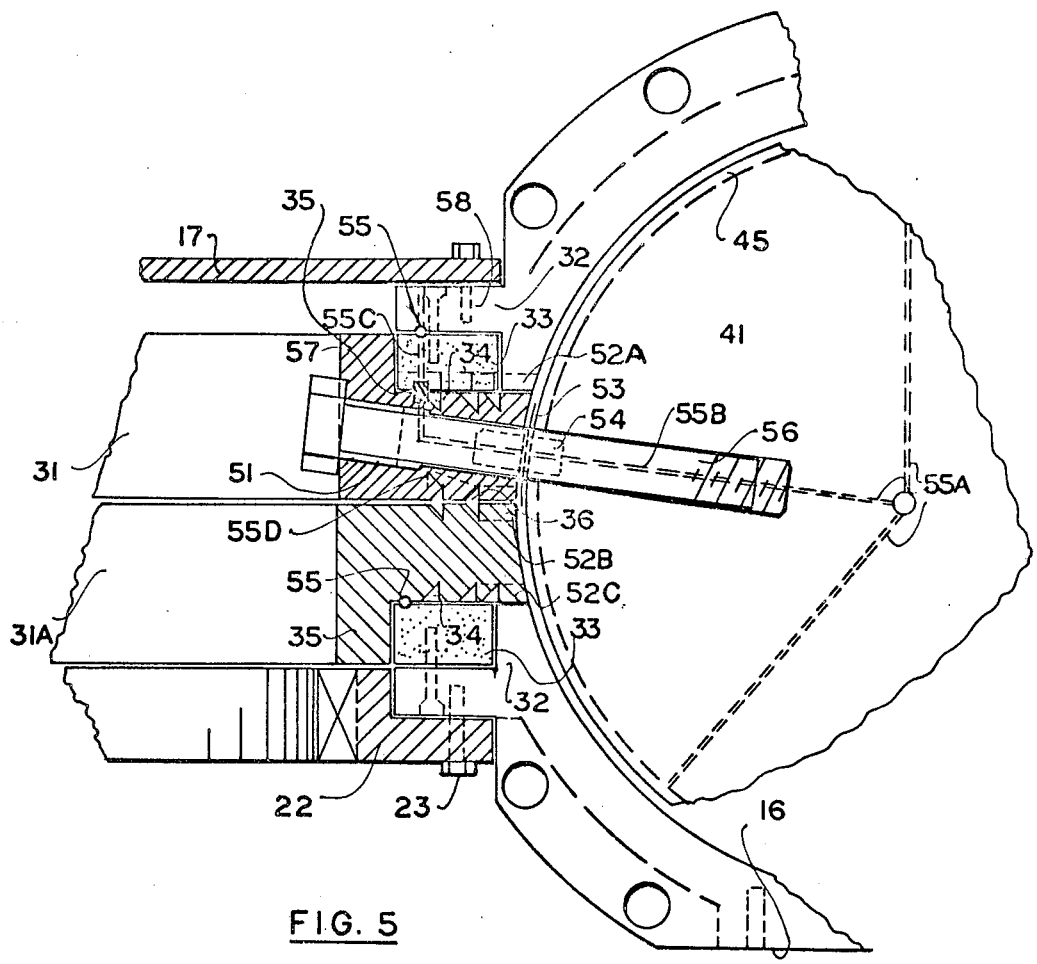
FIG. 5 is a fragmentary cross sectional enlargement showing the sealing means between the rings and the cylinder, the piston mounting means and oiling means.

Reference to FIG. 5 will show that these walls 32 are recessed to receive a seal pad 33 and that triangular shaped annular rings 34 stressed contractually (so that they contract instead of expand as conventional piston rings do) are provided on the outer faces of the rings which bear against these pads and assist in the seal. The rings are provided with inner annular shoulders 35 to assist in stabilizing the piston and ring assembly, the pads 33 being bolted to the casing by recessed bolts as shown in phantom in FIG. 5. The cylinder is provided with annular flanges or lips 58 forming the recess within which the pads 33 are seated.

Triangular shaped annular rings 36, stressed contractually, are provided within annular slots formed on the interfacial areas of the rings 31 and 31A and provide seals between the two rings as clearly shown in FIG. 5.

Arms 37 extend radially inwardly from the inner perimeter of rings 31 and 31A and these arems are slotted as at 38 (see FIG. 6) and engage over a pin 39 extending upwardly from the planetary gears 30 offset from the centre axis thereof. This engagement between the rings and the shaft via arms 37 and the planetary gear system, controls the relative speed of rotation of the rings with reference to the drive shaft 21.

A set of pistons 40A, 40B, 40C and 40D are secured to the periphery of one of the rings 31 and a corresponding set of pistons 41A 41B, 41C and 41D are secured to the periphery of the other of the rings 31A. It will be appreciated from reference to FIG. 6, that the pistons of each set are equidistantly spaced around the rings and that the two sets are offset one from the other by the engagement of the pistons on the ring perimeter.

There are several ways in which the pistons can be secured to the rings and one method is shown in phantom in FIG. 5 in which two alsignment studs 54 for each piston that fit corresponding holes in the sides of the piston. These are set in the carrying rings 31 or 31A and a bolt 56 secures the piston through a hole in the carrying ring with a shim 53 between the piston and the carrying ring to prevent the piston binding.

Each piston is formed as a segment of the toroidal cylinder and is in the form of a double-headed piston having piston rings 45 provided thereon to give an adequate seal between the pistons and the walls of the toroidal cylinder.

Figure 1:
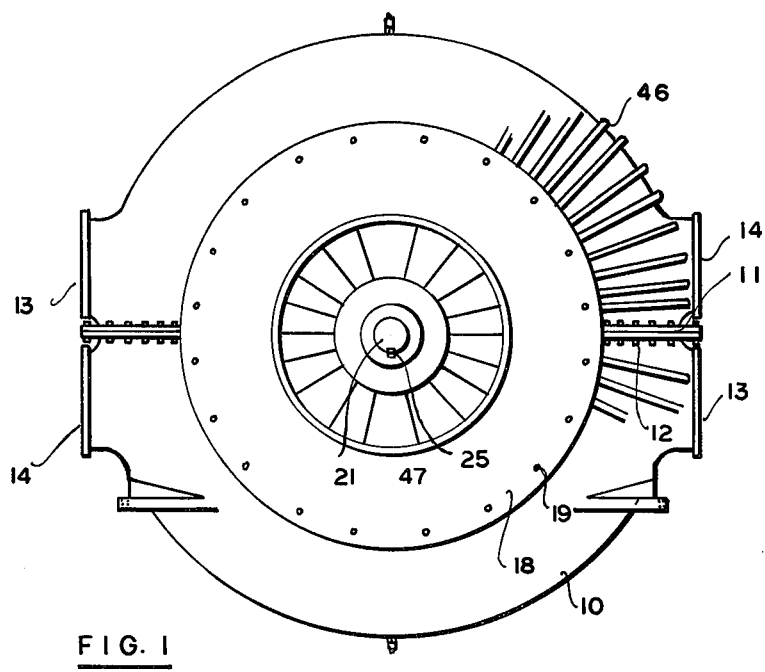
FIG. 1 is an external front view of the invention.

External fins 46 may be provided upon the outer wall of the toroidal cylinder and, if desired, a cooling fan 47 may be secured to the drive shaft as shown schematically in FIG. 1 or the cylinder may be set in a water cooled block (not shown).

Figure 4:
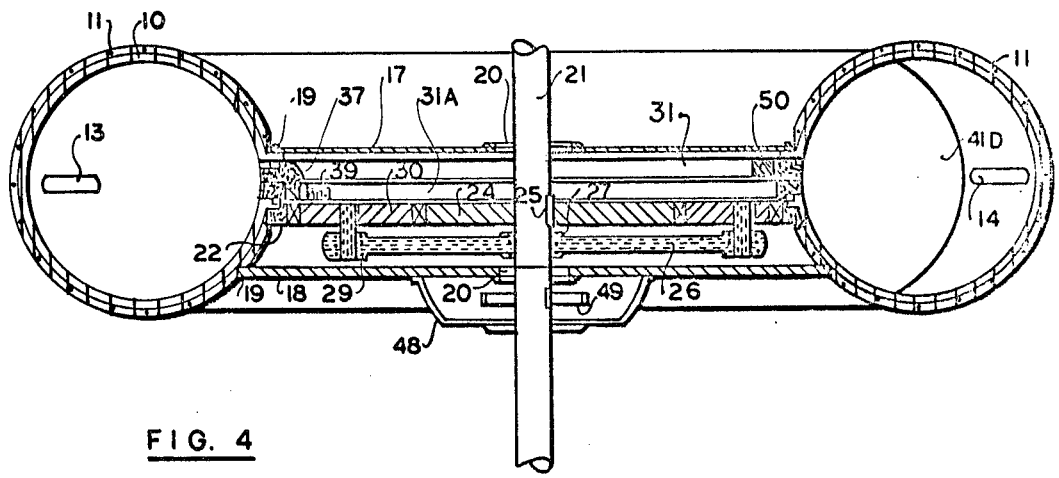
FIG. 4 is a cross sectional view of FIG. 2.

If desired, an oil pan or sump 48 may be provided around the shaft 21 (see FIG. 4) and gear 49 may be secured to the drive shaft 21 to act as a gear for timing the ignition and oil pump driving (if required).

Oil is fed through radially extending oil grooves 55 formed by annular channels in the lip 58 and orifices 55C in the pads 33, where it is picked up by corresponding drillings in the rings and conveyed to radial drillings or passageways 55B extending inwardly through each bolt 56, to each piston 41, to the centre thereoef, and thence by radial drillings or passageways 55A through the reinforcing ribs, to the periphery of the pistons. Part of the oil is diverted to lubricate the sealing rings in the rings 31, 31A (see drillings 55D). An annular space 51 is formed around the bolt near the head thereof and a small cross drilling extends from the surface of the bolt in this space, to the drilling 55B. Various seals are shown in phantom at 52A, B and C and, are provided to prevent forward or backward leakage of the gases. Also an annular seal 57 is provided between the pads 33 and the rings 31, 31A, around the junction between the drilling 55C in the pad and the connection in the ring to the annular space around the bolt 56.

Counter-weights 50 may be provided upon rings 31 and 31A to counteract the weight of the arms 37 and these arms may be provided with curved slots 38A as shown in FIG. 2. The planet gears may also be provided with counter-weights (not illustrated) to offset the weights of the pins mounted thereon.

Although only one connection is required between the relevant planetary gear 30 and the relevant ring 31 or 31A, nevertheless if design parameters require, four such planetary gears may be provided under which circumstances two may be connected to ring 31 by means of the relevant arms and two, to ring 31A.

As mentioned previously, ignition may be by means of spark plugs or by fuel injection and in the present embodiment, spark plugs 51 are provided through the outer wall of the toroidal cylinder diametrically opposite one another and substantially at right angles to the inlet and exhaust ports 13 and 14.

Although two sets of four pistons are illustrated, any even number above four of double-headed pistons per set may be used in internal combustion applications and sets of any number greater than one double-headed pistons per set may be used in steam applications.

Since the number of pistons is given as variable in the previous paragraph, the circumference must also be variable. It can be given in the formula $cp = cr/p$ (in which $cp$ = circumference of planet gear, $cr$ = circumference of ring gear, $p$ = number of pistons per set).

The circumference of the planet gears 30 should be exactly $cr/p$ (where $cr$ = the circumference of the ring gear and $p$ = the number of pistons on one ring), $1/p$, of the circumference of the ring gear 22 — in the case illustrated, one quarter — and the mechanism is assembled so that the planet gear pin 39 engaging one of the arms 37, is nearest to the cylinder ring when the pin on the other planet gear is one quarter of a revolution of the planet gear away from the ring gear and this arrangement as illustrated in the drawings, controls the speed of the two sets of pistons relative to one another, so that successive pistons move at their slowest at exactly the same point (the ignition point) and between the exhause/intake points in the toroidal cylinder.

In operation, and referring to the schematic view of FIG. 6, piston 40B is at near rest until piston 41B has closed the gap between them and exhausted the spent gasses then it (together with the other pistons secured to the relevant ring 31) starts to move away from piston 41B thus increasing the space therebetween and drawing in a new charge through the inlet port 16. The same operation is occurring diametrically opposite with piston 40D increasing its distance from piston 41D.

At the end of the intake stroke, piston 41B starts to catch up thus compressing the gases between pistons 40B and 41B until the two pistons are closest together at approximately 90° from the position illustrated in FIG. 6 whereupon ignition occurs through the spark plug 51 (or other equivalent means).

The timing is such that at the point of ignition, the expansion of gases assists in driving piston 40D away from piston 41D thus imparting power to drive shaft 21 whereupon piston 41B starts to catch up with piston 40B to exhaust the spent gases through the exhaust port 14 approximately 180° from the start of this particular cycle.

The same cycle has occurred in the lower portion of the toroidal cylinder and by the time the original pistons 40B and 41B reach the position shown in FIG. 6 by pistons 40D and 41D, another power stroke has commenced.

In conjunction with the above sequence, as the pins 39 on the planetary gear adjacent piston 40B in FIG. 6, (through which power is transmitted to sun gear 24) approach the gear race via ring 22, the pistons secured to that particular ring slow down and this causes the compression sequence of pistons 40B and 41B to occur as it approaches top dead centre with reference to FIG. 6.

At about the greatest compression point, the gases are ignited and the result of the explosion exerts mutual force on the pistons 40B and 41B, but the force is more effective on piston 40B since the relevant pin 39 is moving away from the outermost position adjacent the ring gear 22 causing the system to rotate. When maximum expansion is reached, the burned gases are expelled at exhaust ports 14 ana new charge of an air-fuel mixture is drawn in behind piston 40B as it advnaces, compressed by piston 41B and the cycle is repeated.

By varying the size of the pistons and the position of the pins 39 on the planetary gears 30 relative to the centers thereof, the compression ratios can be chosen as well as the amount of run-through (that is, how completely the pistons slow down at the points of maximum compression). By curving the arms recessively as illustrated in FIG. 2, the forward piston is allowed to progress faster at the start of the firing stroke than the succeeding piston follows, achieving smoother and more advantageous power transmission and also increasing the length of the combustion chamber utilizing more of the explosive energy of the fuel.

The engine is assembled in stages. First, the pistons are inserted in the cylinder in their proper sequence and then the cylinder rings with their seals and pads are placed in one-half of the toroidal cylinder and the other half is engaged over the cylinder rings. By previously aligning the piston and cylinder rings with marks on the casing the pistons can be bolted to the cylinder rings in the correct position and the shims 53 can be provided between the pistons and the rings to prevent binding.

Reference to FIG. 6 will show that if inlet and exhaust ports are provided at substantially 90° from those illustrated, the engine can readily be adapted for use with steam.

Since various modifications can be made in my invention as hereinabove described, and many apparently widely different embodiments of same mode within the spirit and scope of the claims without departing from such spirit and scope, it is intended that all matter contained in the accompanying specification shall be int erpreted as illustrative only and not in a limiting sense.

What I claim as my invention is:

1. An internal combustion engine which includes inlet and exhaust means, fuel supply means and means to ignite said fuel within said engine; comprising in combination a toroidal cylinder having an annular slot formed in the inner circumference thereof, a drive shaft supported for rotation axially of said cylinder, a pair of piston carrying components surrounding said axle, a set of pistons set substantially equidistantly around the perimeters of each of said piston carrying components and mounted for annular movement within said cylinder, said piston carrying components having means sealably engaging within said annular slot, and means co-acting between said shaft and said piston carrying components to control relative movement of each of said piston carrying components with the other and hence the relative position of pistons on one of said piston carrying components and pistons on the other of said piston carrying components, said means coacting between said shaft and said piston carrying components including a sunwheel keyed to said shaft, a ring gear secured around said cylinder adjacent said slot and substantially in the same plane as said sun gear, a plurality of planetary gears meshed with said sun gear and said ring gear, and means to support said planetary gears for rotation, said piston carrying means comprising a pair of rings engaging in said slot, annular sealing means between said rings and further annular sealing means between said rings and the walls of said cylinder defining said slot, said pistons being secured to the outer perimeter of said rings, and means to center said rings concentrically around said shaft and to center said pistons within said torodial cylinder, said last mentioned means comprising an annular recess formed around the walls defining said slot, annular seal pads secured within said recess and an inner annular shoulder formed on each of said rings engageable with said seal pads to center said rings and hence said pistons secured to said rings, said annular sealing means between said rings including an inner annular triangular shaped recess formed on the interfacial faces of each of said rings, and an inner contractually stressed triangular cross sectioned sealing ring engaged within said inner recesses and spanning between said rings, said inner recesses and said inner triangular ring being positioned whereby gas passing under pressure from said cylinder acts upon said inner triangular ring, to force same into further sealing engagement with the walls of said inner recesses with a wedging action.

2. The engine according to claim 1 in which said means to support said planetary gears for rotation includes a spider journalled for rotation upon said axle, said planetary gears being journalled for rotation upon the distal ends of said spider.

3. The engine according to claim 1 in which said means co-acting between said shaft and said piston carrying components further includes a slotted arm secured to each of said piston carrying components and extending from adjacent said slot radially inwardly, means on said planetary wheels offset from the center thereof slidably engaging within said slotted arm thereby controlling the relative speeds of said pistons as said pistons and said piston carrying components rotate.

4. The engine according to claim 2 in which said means co-acting between said shaft and said piston carrying components further includes a slotted arm secured to each of said piston carrying components and extending from adjacent said slot radially inwardly, means on said planetary wheels offset from the center thereof slidably engaging within said slotted arm thereby controlling the relative speeds of said pistons as said pistons and said piston carrying components rotate.

* * * * *